United States Patent [19]

Keydell et al.

[11] 4,082,418
[45] Apr. 4, 1978

[54] BINOCULAR BARREL WITH ADJUSTABLE INTERPUPILLARY DISTANCE AND TARGET MARKER SUPPORT

[75] Inventors: Willi Keydell, Oberkochen; Herbert Binder, Aalen-Hofherrnweiler, both of Germany

[73] Assignee: Carl Zeiss-Stiftung, Oberkochen, Germany

[21] Appl. No.: 706,202

[22] Filed: Jul. 19, 1976

[30] Foreign Application Priority Data

Aug. 27, 1975 Germany ............................ 2538048

[51] Int. Cl.² ...................... G02B 27/32; G02B 21/20; G02B 7/12
[52] U.S. Cl. ........................................ 350/10; 350/75; 350/35
[58] Field of Search ...................... 350/10, 35, 75, 76

[56] References Cited

U.S. PATENT DOCUMENTS 1,965,755  7/1934  Warmisham ........................ 350/75 X
3,914,012  10/1975  Boughton .............................. 350/75

FOREIGN PATENT DOCUMENTS 410,993  4/1910  France ...................................... 350/75
360,234  11/1931  United Kingdom ..................... 350/10

Primary Examiner—Jon W. Henry
Attorney, Agent, or Firm—Hopgood, Calimafde, Kalil, Blaustein & Lieberman

[57] ABSTRACT

The invention contemplates a binocular barrel system as for use in a microscope wherein an oriented target line at the focal plane of the eyepiece is kept at consistently the same orientation with respect to the viewed object, in spite of the fact that the eyepiece housings are swivel-mounted to the barrel for accommodation to the interpupillary distance of the observer. A parallelogram system so coordinates rotation of the target-line support at the eyepiece, with rotational displacement of the eyepiece about the barrel, that the correct orientation is seen by any and all observers, regardless of individual differences in interpupillary distance.

6 Claims, 5 Drawing Figures

BINOCULAR BARREL WITH ADJUSTABLE INTERPUPILLARY DISTANCE AND TARGET MARKER SUPPORT

The present invention relates to a binocular barrel by means of which interocular distance is adjustable by rotary articulation around the central axis of the incidentray bundle and which contains a line target arranged in the focal plane of the eyepiece.

In many fields of microscopy, it is necessary qualitatively to evaluate the object image. For this purpose it is advantageous to arrange in the focal plane of the microscope eyepiece a line target or marker which the observer sees sharply at the same time as the image of the object. The line target can be developed as a crosshair, as a micrometer scale, as a grid or otherwise, depending on the intended purpose or use. If the purpose of the line target is to mark a directionally oriented field, or to mark in the eyepiece focal plane a direction which is to serve as the reference direction for the orienting of microscopic objects to be viewed, it is then necessary for the line target to retain its direction throughout all possible adjustments. This problem is presented in particular in the case of polarization microscopes, in which case the line target in the focal plane of the eyepiece serves as reference direction for orienting the microscopic preparation to be evaluated.

Microscopes are being increasingly equipped with binocular barrels, for binocular viewing of the object. Such binocular barrels are so constructed that they permit adjustment to different interpupillary distances.

When using a binocular barrel in which both eyepieces are displaced along a straight line in order to adapt them to the pupillary distance of the viewer, a mechanical or optical equilization is necessary, since the mechanical barrel length changes upon displacement of the eyepieces. With such barrels, the direction of line targets in the eyepiece focal plane remains the same upon the adjustment of the pupillary distance.

Binocular barrels are also known in which the interocular distance can be changed by swivel action, using the incident ray as the swivel axis. Such barrels have the advantage that the mechanical barrel length does not change upon adjustment of the interpupillary distance so that no equilization is necessary. For this reason, such binocular barrels, exemplified by the so-called Siedentopf design, are of relatively simple construction. However, they have the disadvantage that line targets in the eyepiece focal-plane change their direction in the course of any adjustment of interpupillary distance.

It is accordingly an object of the invention to provide an improved binocular barrel system of the character indicated wherein the interpupillary distance can be adjusted without changing the orientation of any given reference marking in the focal plane of a viewing element.

A specific object is meet the above object in a binocular-barrel system in which interocular distance is changed by rotation about the incident ray bundle.

A further object is to achieve the above objects with relatively simple construction and low cost.

Briefly stated, these objects are achieved in accordance with the invention by so mounting the eyepiece housings with respect to each other that a "four-bar linkage" is established as the basis for adjusted eyepiece-target displacement. Specifically, the target support in each eyepiece housing incorporates two pivot points of a parallelogram, the other twopivot points of which are fixed firmly on the instrument.

For each eyepiece housing, the fixed pivot points establish the direction of one side of the parallelogram, thus automatically fixing the direction of the other side, namely the movable line connecting the two other pivot points. Since these movable pivot points are part of the mounting for the eyepiece housing, this housing retains its direction in space, as established by the pivot points fixed to the instrument housing, whatever the adjustment of interpupillary distance. In the course of such adjustment, the eyepiece axis is displaced in rotation about the rotary axis of the binocular barrel.

One particularly simple and elegant structural solution is obtained if for each parallelogram one of the fixed-pivot points is made to coincide with the axis about which the ocular housing is articulated about the binocular barrel. In such case, the parallelogram can be established for each eyepiece housing by a single link which interconnects an off-axis pin fixed on the instrument with another pin which is correspondingly offset on the target support within the eyepiece housing.

It is advantageous to design the new binocular barrel such that its axis of rotation coincides with the center point of a disk secured to the instrument, with two control pins carried by the disk and arranged in symmetrical offset with respect to the center point of the disk, each of said pins serving as a fixed pivot point for the parallelogram associated with a different one of the two eyepiece housings.

In order to permit orientation adjustment of the line target, the part of the eyepiece housing which carries said target may be rotatable with respect to the part which completes the parallelogram connection.

The invention will be explained in further detail below with reference to the accompanying drawings, in which.

Figure 1:
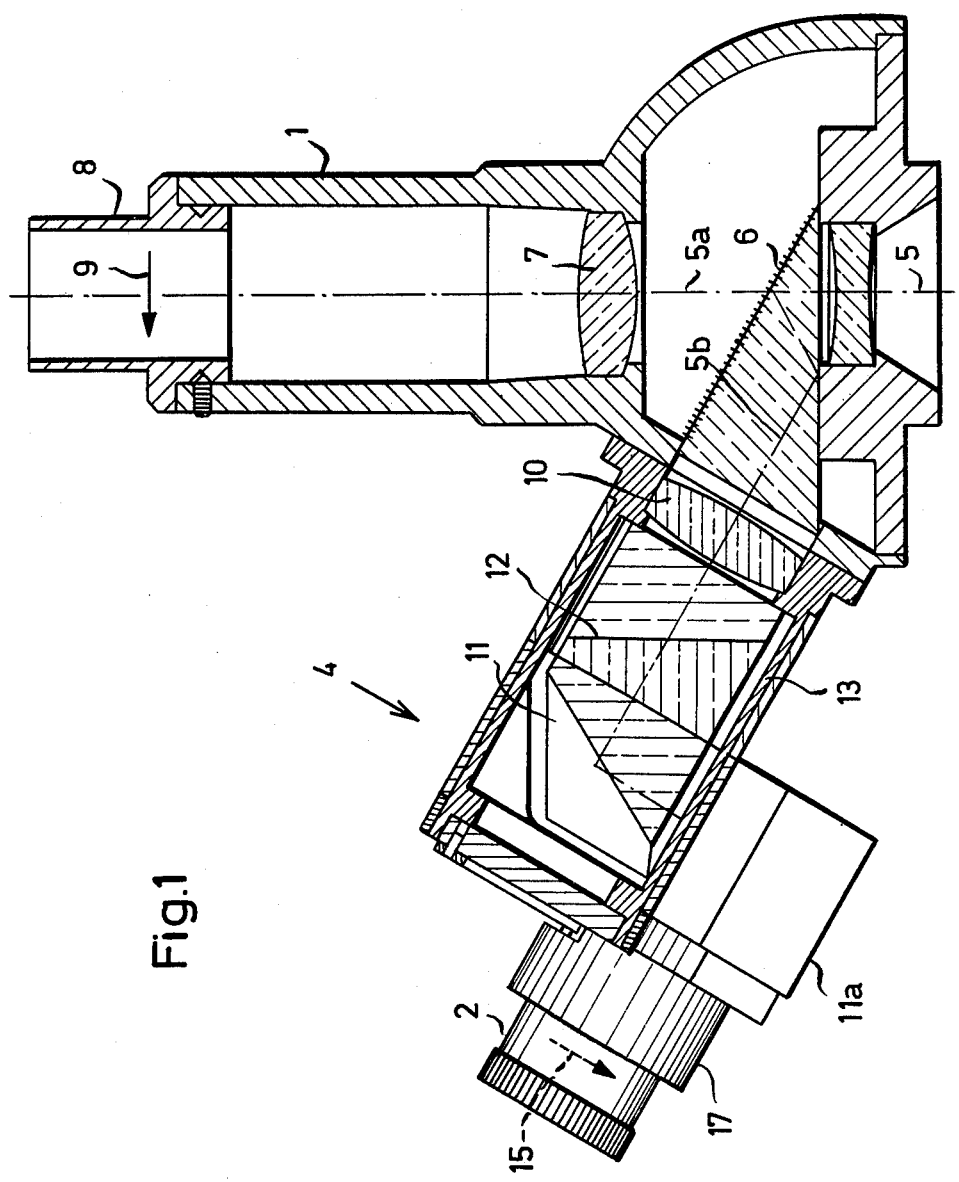
FIG. 1 is a section through the upper part of a microscope equipped with a binocular barrel of the invention and with an additional (third) viewing tube, the section being taken generally in the plane defined by the optical axes of the barrel and of the additional tube.
Figure 2:
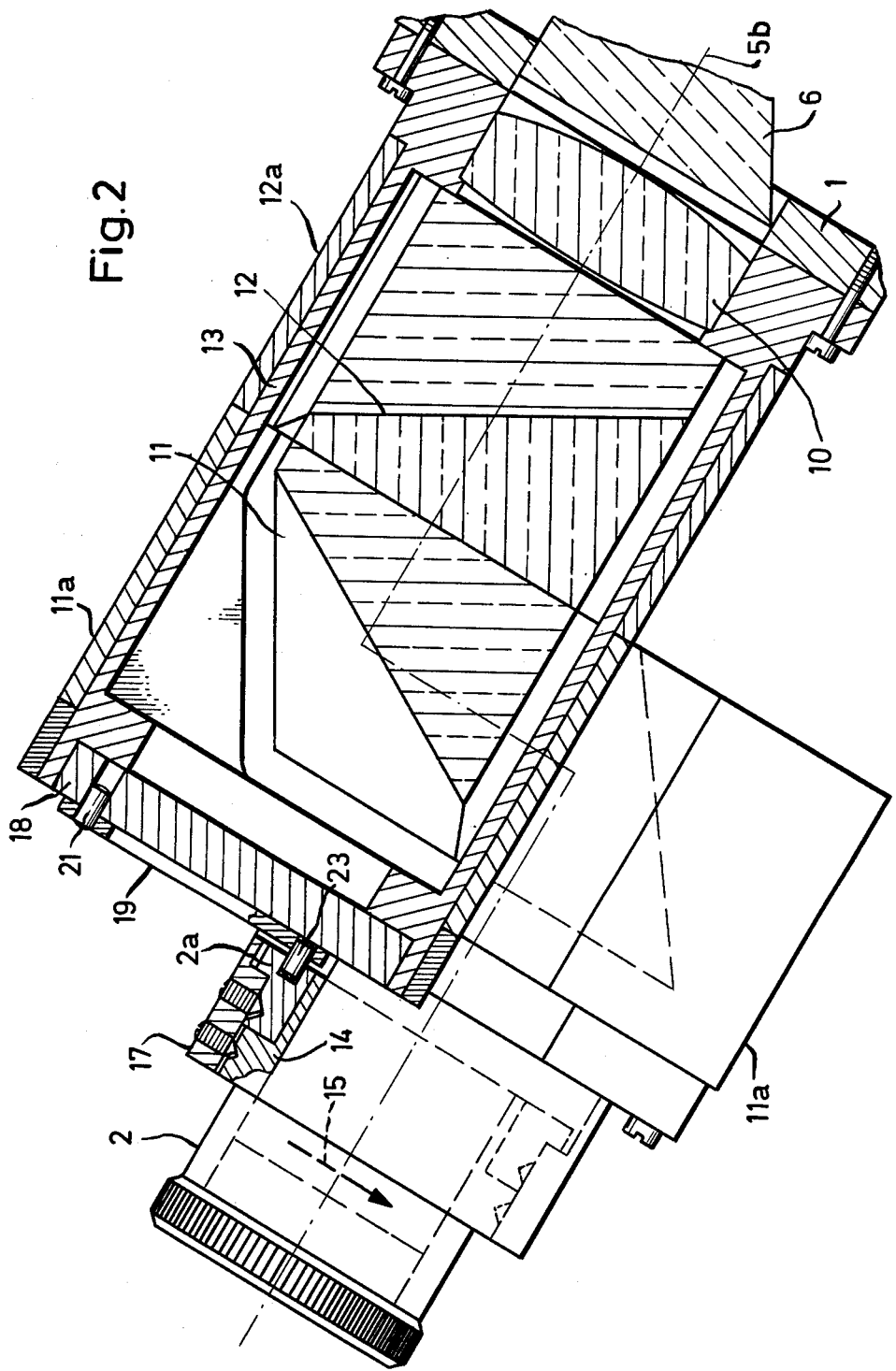
FIG. 2 is an enlarged fragmentary view of the binocular barrel portion of FIG. 1.

FIG. 1 shows the upper part 1 of a microscope stand. The left-hand eyepiece housing 2 of a binocular barrel 4 is visible in FIG. 1, and the right-hand housing 3 (FIGS. 3 and 4) will be understood to be above the section plane of FIG. 1. The observation-ray path 5 coming from the object is split by means of a semi-pervious prism 6, and extends at 5a, via a lens 7, into an eyepiece housing 8 which contains a line target indicated symbolically by an arrow 9. The eyepiece housing 8 is rotatably supported in the microscope stand 1 so that the direction on the line target 9 can be adjusted, and a set screw is shown to hold a given setting. The stand part 1 will be understood to be adapted particularly for use as a photographic tube, in conjunction with camera means (not shown).

The split portion 5b of the observation light path 5 passes through a lens 10 into a prism system which consists of two rhomboidal prisms 11 and 12 and is shown to be of the so-called Siedentopf construction. By means of this system of prisms, the ray bundle along axis 5b is divided up into a right-hand ray bundle and a left-hand ray bundle. The prisms 11 and 12 are surrounded by prism housings 11a and 12a which in their turn are rotatable about a hollow shaft 13, concentric with the axis of ray bundle 5b. The hollow shaft 13 is rigidly connected with the microscope stand 1 and contains the prisms 11 and 12. Each of the eyepiece housings 2 and 3 has a line target in its eyepiece focal plane, and for the respective eyepiece housings these line targets are set in carrier rings 14, each of which is manually rotatable in a collar piece 17 of one of the prism housings 11a, 12a, to permit individually adjusted directional orientation of the line targets.

The hollow shaft 13 is rigidly connected at its front end to a closure disk 18, centered at 25 on the barrel axis (axis of ray bundle 5b). As can be noted from FIG. 3, this disk contains two pivot bearings formed by the pins 21 and 22. Each of these pins is arranged at the same radius from the center of disk 18, and these pins are symmetrically offset on opposite sides of the vertical plane of symmetry through point 25. A control link 19 is connected at one end to pin 21 and its other end is connected, at pin 23, to a flanged ring 2a, assembled to and rotatable with the carrier ring 14. In similar fashion, a control link 20 is connected between pin 22 and a pin 24 on a flanged ring 2a associated with the carrier ring 14 in eyepiece housing 3. On the left-eyepiece side of the system, the effective length of link 19 is equal to the distance between central axis 25 and the left eyepiece axis 26, and the radius of pin 23 about axis 26 is equal to the radius of pin 21 about axis 25; on the right-eyepiece side of the system, link 20 bears a similar relationship to the corresponding axes 25-27.

Figure 3:
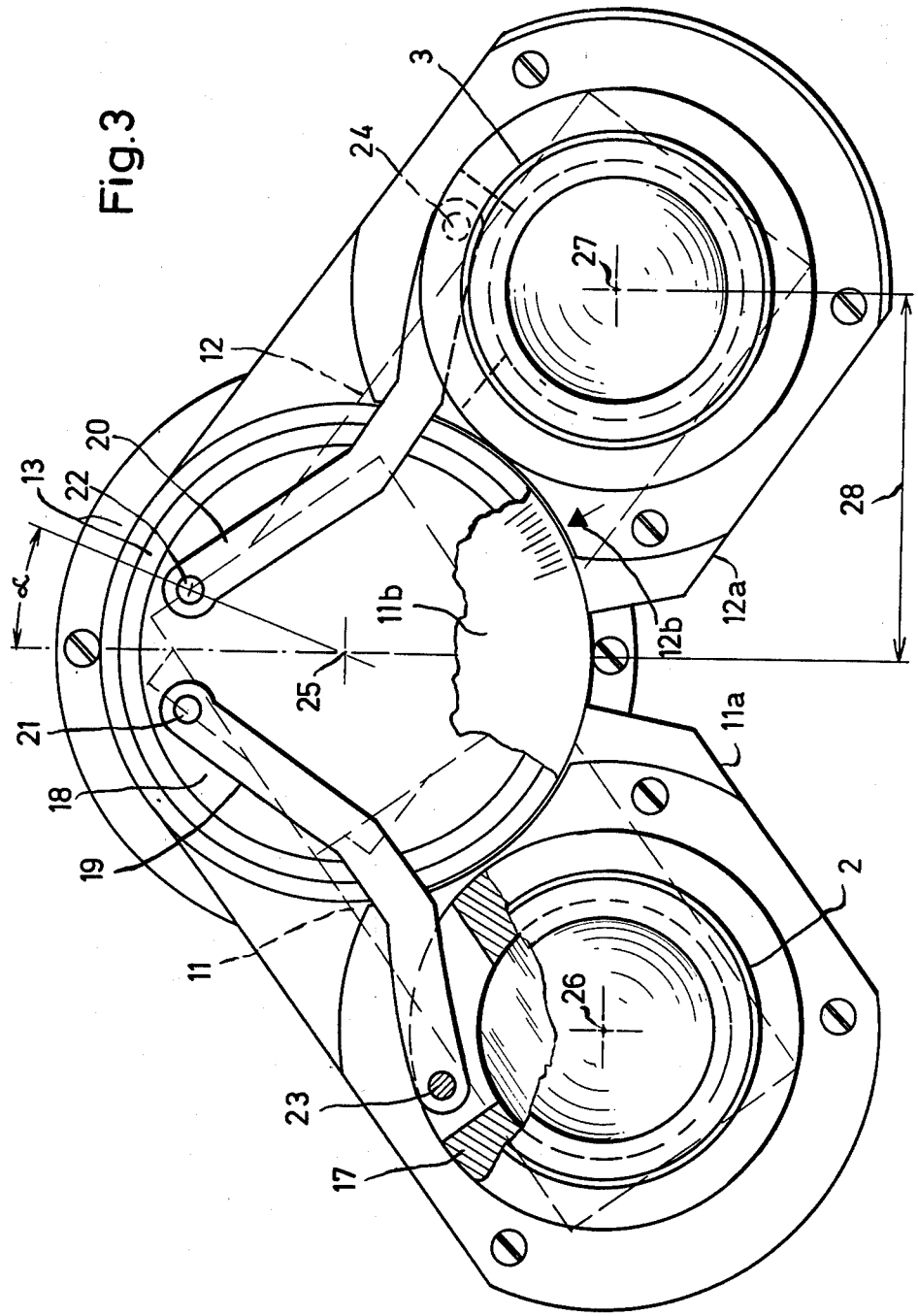
FIG. 3 is a front end view of the binocular barrel of FIG. 1, to the scale of FIG. 2.
Figure 4:
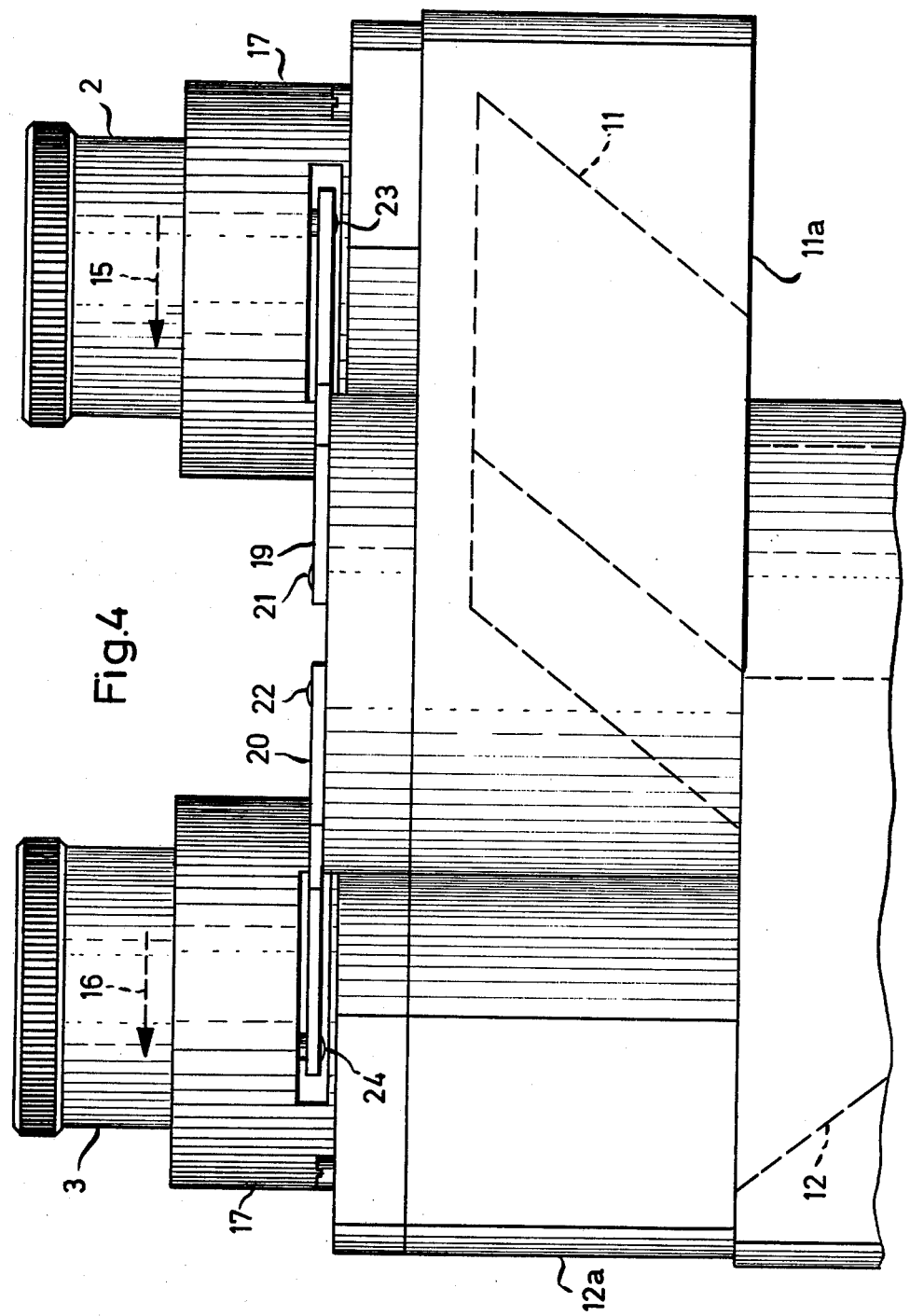
FIG. 4 is a top view of the binocular barrel of FIG. 1, to the scale of FIGS. 2 and 3.
Figure 5:
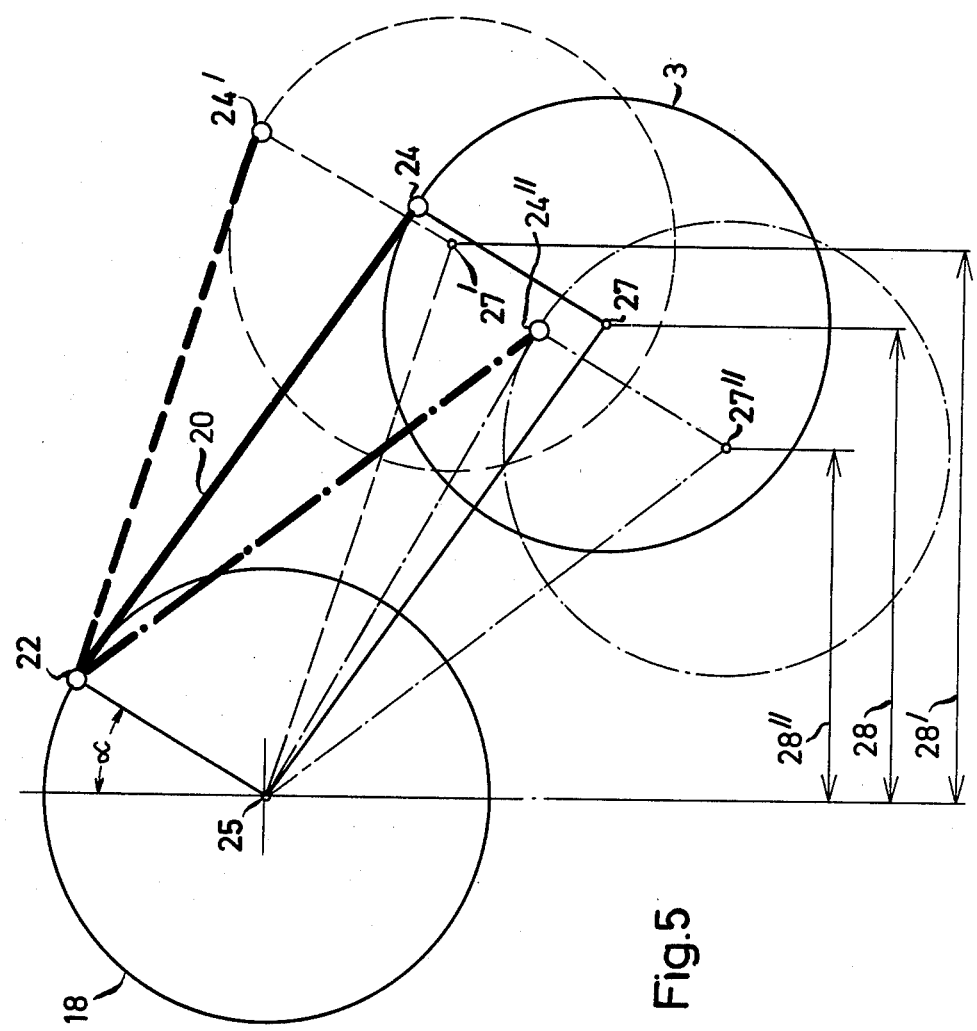
FIG. 5 is a kinematic diagram of the new binocular-barrel suspension.

As can be noted in particular from FIGS. 3 and 5, two parallelograms are produced by the links 19 and 20 and their pin connections 21-23 and 22-24, respectively. Each of these parallelograms has four pivot points. In the case of prism housing 11a, the four pivot points are established by pin 21, pin 23, the disk center 25 (i.e., the rotary axis of the binocular barrel 4), and the central axis 26 of the eyepiece housing 2, it being recalled that axis 26 is both the optical axis and the rotational axis of the eyepiece housing 2. The fixed spacing between axes 25 and 26 is clearly and unequivocally established by the structure of the prism housing 11a and its reference at 13 to the binocular barrel 4.

By similarity of parts, the parallelogram associated with eyepiece housing 3 and the prism housing 12a is seen to have the pivot points 22, 24, 25 and 27.

When observing and evaluating an object, for instance by means of a polarization microscope, the object is first of all centered and oriented, and the image of the object focused. The object is oriented on basis of the line targets 15, 16, the direction of which can be adjusted by turning the eyepiece housing 2, 3 and thus the respective rings 14 contained therein.

Upon a change in the observer, a change in the interpupillary distance of the eyepieces is normally necessary. For this purpose, the prism housings 11a, 12a are turned by hand about the axis of rotation of the binocular barrel, i.e. about the axis which passes through the point 25 and coincides with the light ray 5b. As shown in particular in FIGS. 3 and 5, the pivot points 25, 22 and 21 are fastened to the instrument and determine the respective directions of arms 25-22 and 25-21. Upon turning the prism housings 11a-12a about the swivel axis 25 of the binocular tube 13, the links 19 and 20 are necessarily swung, and since the arms 22-24, 25-27 and 21-23, 25-26 are of the same length, the directions of arms 24-27 and 23-26 always remain parallel to their respective reference arms 25-22 and 25-21, which are fixed on the instrument. Thus, the eyepiece housings 2 and 3 and the line targets 15, 16 contained therein retain their originally set orientations.

This result is particularly clear from FIG. 5, where for the case of eyepiece housing 3, different positions of the parallelograms 22, 24, 25, 27 are shown for various semi-interpupillary distances 28, 28' and 28'', using single-prime and double-prime notation for the correspondingly displaced pivot points 24, 27.

It will be understood that for purposes of illustration, our new binocular-barrel construction has been dhown diagrammatically. For good mechanical design, the angle $\alpha$ by which the fixed arm 25-22 is inclined to the central plane of symmetry is perpendicular to link 20 (and also to the arm which interconnects axes 25-27) when the eyepiece housings are swung to serve the interpupillary distance most normal for adults, for example a semi-interpupillary distance of 32.5mm.

In the finished article all moving parts are covered. Part of the converage may include a disk 11b centered on the alignment 5b, carried by housing 11a in front of the disk 18, and advantageously inscribed or otherwise provided with a scale which is direct-reading in interpupillary distance; such scale may cooperate with an adjacent reading mark 12b on the other prism housing 12a, all as schematically suggested in FIG. 3.

What is claimed is:

1. A single-barrel binocular-viewing system for an optical instrument, comprising frame-based structure including an elongate tube adapted to receive and pass an incident ray bundle along the tube axis, two eyepiece housings each including offset-arm housing structure rotatably connected to said tube, whereby said eyepiece housings may be adjusted for interpupillary distance, optical means for splitting the incident ray bundle for concurrent observation via eyepieces in said housings, a first target-marker support ring at the eyepiece focal plane of one of said housings and rotatable about the eyepiece axis of said one housing, means including a link of effective length equal to the rotary offset of said eyepiece axis from the axis of said tube for maintaining a constant orientation of said marker support ring with respect to said tube, said link being pinned at one end to said ring and at the other end to said framebased structure at points which are at equal-radius offset from the ring axis and from the tube axis respectively, a second target-marker support ring at the eyepiece focal plane of the other of said housings and rotatable about the eyepiece axis of said other housing, and a second similar link similarly connecting said second target-marker support ring to said frame-based structure.

2. The binocular-viewing system of claim 1, in which said frame-based structure includes a disk closing the front end of said tube, both said links being pin-connected to said disk.

3. The binocoular-viewing system of claim 1, in which at least one of said support rings includes target-marker support means carried by said one ring and adjustably rotatable with respect to said one ring.

4. A single-barrel binocular-viewing system for microscope or the like, comprising frame-based structure including an enlongate tube adapted to receive and pass an incident ray bundle along the tube axis, two eyepiece housings each including offset-arm housing structure rotatably connected to said tube for articulation about the tube axis to accommodate to the interpupilary distance of an observer, optical means for splitting the incident ray bundle for concurrent observation via eyepieces carried by said housings, a separate target-marker support associated with each one of said housings and rotatable about the eyepiece axis thereof, first four-bar linkage means connecting one of said supports to said frame-based structure and establishing constant angular orientation of one of said target-marker supports with respect to the angular orientation of said tube regardless of adjusted angular positioning of said one housing about said tube, and second four-bar linkage means connecting the other of said supports to said frame-based structure and similarly establishing constant angular orientation of the other of said target-marker supports with respect to the angular orientation of said tube.

5. The binocular-viewing system of claim 4, in which each said four-bar linkage means comprises the associated one of said housings as a first fixed link of effective length equal to the distance between the tube axis and the rotary axis of the target-marker support, and a second link of said length and parallel to said first link, said second link being pivotally connected at one end to said tube and at the other end to the associated one of said target-marker supports, the latter points of connection being at equal offsets from the tube axis and from the support-rotation axis respectively.

6. A unitary single -barrel binocular-viewing system for view-axis mounting to a microscope or the like, comprising frame-based structure for fixed mounting to the microscope and including an elongate tube adapted to receive an incident ray bundle along the tube axis, two eyepiece housings each of which includes offset-arm housing structure rotatably connected to said tube for articulation about the tube axis to accommodate the interpupilary distance of an observer, optical means for splitting the incident ray bundle for concurrent observation via eyepieces carried by said housings, a target-marker support associated with one of said housings and rotatable about the eyepiece axis thereof, whereby a reticule or the like carried by said support may be used to establish a desired orientation of a microscope-supported specimen being observed by the viewing system, and reticule-orientation control means including a link of effective length equal to the radial offset of the eyepiece axis of said one housing with respect to the tube axis, said link being pivotally connected at one end to a marginal location on said rotatable support and pivotally connected at its other end to said frame-based structure, said pivotal connection to said support being at the same radial distance from the eyepiece axis of said one housing as the radial distance from the tube axis to the pivotal connection of said link to said frame-based structure, and said pivotal connections being offset in the same direction away from the line between the tube axis and the eyepiece axis of said one housing, whereby regardless of the articulated positioning of either of said housings, a viewed specimen and a reticule in said one housing will maintain said desired orientation.

* * * * *